United States Patent
Lindner (10) Patent No.: US 10,470,443 B2
(45) Date of Patent: Nov. 12, 2019

(54) POND PUMP WITH A SELF-CLEANING FILTER UNIT

(71) Applicant: Frank Lindner, Emsdetten (DE)

(72) Inventor: Frank Lindner, Emsdetten (DE)

(*) Notice: Subject to any disclaimer, the term of this patent is extended or adjusted under 35 U.S.C. 154(b) by 0 days.

(21) Appl. No.: 15/852,055

(22) Filed: Dec. 22, 2017

(65) Prior Publication Data

US 2018/0116188 A1     May 3, 2018

Related U.S. Application Data (63) Continuation of application No. PCT/EP2016/063660, filed on Jun. 14, 2016.

(30) Foreign Application Priority Data

Jun. 25, 2015 (DE) .................... 20 2015 103 366 U (51) Int. Cl.
| | |
|---|---|
| *A01K 63/04* | (2006.01) |
| *F04D 7/04* | (2006.01) |
| *F04D 13/08* | (2006.01) |
| *F04D 29/22* | (2006.01) |
| *F04D 29/70* | (2006.01) |
| *B01D 33/15* | (2006.01) |
| *B01D 33/46* | (2006.01) |
| *B01D 33/52* | (2006.01) |
| B01D 29/66 | (2006.01) |
| F04D 29/048 | (2006.01) |
| B01D 35/02 | (2006.01) |

(Continued)

(52) U.S. Cl.
CPC .......... *A01K 63/045* (2013.01); *A01K 63/047* (2013.01); *B01D 33/155* (2013.01); *B01D 33/466* (2013.01); *B01D 33/52* (2013.01); *F04D 7/045* (2013.01); *F04D 13/086* (2013.01); *F04D 29/2288* (2013.01); *F04D 29/708* (2013.01); B01D 29/33 (2013.01); B01D 29/666 (2013.01); B01D 35/02 (2013.01); E04H 4/1245 (2013.01); F04D 29/048 (2013.01)

(58) Field of Classification Search
None
See application file for complete search history.

(56) References Cited

U.S. PATENT DOCUMENTS

| | | | |
|---|---|---|---|
| 2,243,585 A | | 5/1941 | Maurice Towler et al. |
| 3,823,831 A | * | 7/1974 | LeBlanc, Jr. .......... B01D 35/02 210/408 |

(Continued)

FOREIGN PATENT DOCUMENTS

| | | |
|---|---|---|
| CN | 102041052 A | 8/2011 |
| CN | 204239279 U | 4/2015 |

(Continued)

*Primary Examiner* — Chester T Barry
(74) *Attorney, Agent, or Firm* — Jeffrey Joyce, Esq.

(57) ABSTRACT

A pump-and-filter assembly for use in a pond, pool, or fountain. The pump unit creates a flow of water into an intake port and out through a discharge port and a filter unit mounted in front of the pump unit for filtering water flowing through the pump. The filter unit has a turbulence-producing device that produces turbulence in the water on the outside of the filter element. The turbulence in the water that is being drawn into the filter impedes or prevents the build-up of material deposits on the outside surface of the filter element.

18 Claims, 5 Drawing Sheets

(51) Int. Cl.
 *B01D 29/33* (2006.01)
 *E04H 4/12* (2006.01)

(56) References Cited

U.S. PATENT DOCUMENTS

| | | | | |
|---|---|---|---|---|
| 3,840,123 A | * | 10/1974 | McClure | B01D 29/114 |
| | | | | 210/167.01 |
| 4,210,539 A | * | 7/1980 | Shiban | B01D 33/067 |
| | | | | 210/391 |
| 5,565,012 A | * | 10/1996 | Buodd | B01D 46/0068 |
| | | | | 15/352 |
| 5,815,544 A | * | 9/1998 | Lefter | B01D 29/15 |
| | | | | 376/313 |
| 6,336,561 B1 | | 1/2002 | Kossik | |
| 6,520,752 B1 | * | 2/2003 | Hosford | A01K 63/045 |
| | | | | 417/313 |
| 7,662,296 B2 | * | 2/2010 | Pancaldi | B01D 29/23 |
| | | | | 100/110 |
| 8,608,955 B2 | * | 12/2013 | Steiner | B01D 33/067 |
| | | | | 210/157 |

FOREIGN PATENT DOCUMENTS

| | | |
|---|---|---|
| GB | 1076462 A | 7/1967 |
| JP | S6232299 A | 2/1987 |
| KR | 101019856 B1 | 3/2011 |

* cited by examiner

POND PUMP WITH A SELF-CLEANING FILTER UNIT

BACKGROUND INFORMATION

Field of the Invention

The invention relates to the field of field of water pumps. More particularly, the invention relates to pumps that are used in ponds, pools, fountains, and other water features.

Discussion of the Prior Art

Water pumps are used in a multitude of applications, such as in cooling circuits of internal combustion engines or in industrial applications where water is used to cool machinery or to transport material. Pond pumps are used to pump water in ponds, pools, water fountains and other water features, preferably outdoors, for example, in gardens, on terraces, and the like. The term water pump as used hereinafter refers to these pond pumps, rather than to other types of water pumps that are used in mechanical or industrial environments.

A filter is typically placed upstream of the intake port on the pond pump to prevent undesired particulate matter from getting into the chamber that transports the pumped water. Different types of filters may be used, such as, for example, a metallic mesh basket or a perforated plate and which have apertures dimensioned to hold back particulate matter, such as plant parts, insects, debris, and the like.

A common problem with pond pumps is that organic matter and other debris, for example, the remains of aquatic plants, insects, leaves, and the like accumulate on the outside of the filter and eventually clog the filter. As a result, the volume of water pumped by the pump is significantly reduced. If a pond pump is used to pump pond water into a filter tank so that filtered water can flow back into the pond, and the pump output is reduced because of a clogged filter, then the desired filter effect cannot be guaranteed.

A "rotating ball" water fountain is used as an example of a problem that occurs because of particulate matter or debris in the pumped water. A pond pump is used to pump water beneath a ball placed over a base. The ball floats on the water film, above its support, in an almost frictionless manner, i.e., impeded solely by the friction created between the water and the ball. The continuously flowing motion of the water keeps the ball in rotation. If the pump output is reduced, the water film may be insufficient to maintain the rotational motion of the ball, with the result that the ball will come to a standstill.

In addition to a clogging the filter and reducing pump output, particulate matter that passes through the filter may cause clogging downstream of the pump and also hinder rotation of the ball. For example, the matter may be deposited on the support beneath the ball, thereby narrowing the gap between ball and support. Any build-up of deposits in this area can act like a mechanical brake, because the flow of water within the water film is insufficient to keep the ball in rotation.

Apart from the example of the rotating ball, pond pumps are used in a multitude of water features or fountains that have moving parts that require sufficient water flow to maintain the desired decorative or entertaining water effect. Thus, it is important, that the pump filter maintain sufficient porosity to ensure the specified pump output.

As a result, the filters on the pond pumps need to be cleaned periodically to maintain the efficiency of the pump. Often, however, pond pumps are hidden away for optical reasons and, thus, are poorly accessible, and this reduces the likelihood that the maintenance is carried out with the necessary regularity.

BRIEF SUMMARY OF THE INVENTION

It is an object of the invention to improve on the conventional pond pump and to provide a pump-and-filter assembly according to the invention enables the flow of a large volume of water over a long period of time with the least requirement on maintenance. The pump-and-filter unit according to the invention includes a pump unit and a filter unit that includes a turbulence-producing device.

The inventive concept is to create turbulence in the water on the filtered and unfiltered sides of the pump filter element, the purpose of the turbulence being to prevent particulate matter from being deposited onto the filter element or getting into the filter chamber. The filter unit is provided upstream of the pump unit, so that water flows through the water-permeable element, i.e., the filter element, before it flows into the intake port of the pump and then out the discharge port. The turbulence-producing device, referred to hereinafter as a swirler, may be arranged within and/or outside the filter element, or the filter element itself may serve as the swirler. In the latter case, the filter element is set in motion to cause turbulence of the water in the immediate vicinity of the filter element. The turbulence hinders or effectively prevents the accumulation of dirt, debris, or other material on the filter element, thereby reducing or eliminating the chance that deposits of material build up on the filter element, eventually clogging it. The turbulence thus ensures high pump output over a long period of time, thereby ensuring that the pump output reliably corresponds to the specified volume of water or to the specified pump pressure that is needed to produce a water column to a specified height.

Because the filter element is kept free from contamination, it is possible to provide filter elements with a finer porosity, i.e., with comparatively smaller flow openings. This finer grade of filter element reduces the particle loading on the water that is transported by the pump, further reducing the likelihood of clogging or reduced pump output.

Material accumulation on the outside of the filter element not only reduces the pump output, but also reduces the speed of flow that carries the material onto the outside surface of the filter element and presses the material onto the element. In this situation, the turbulence effect of the swirler increases relative to the pump-suction flow. This is because both pump and swirler continue to operate at the same number of revolutions and, although the output of the pump is reduced, the action of the swirler is not. The turbulence created in the water by the swirler is sufficient to loosen the material that the reduced flow of water carries onto the filter element material, thereby achieving a self-cleaning effect of the filter.

Despite the self-cleaning action of the swirler, some filter maintenance to remove particulate matter from the filter element may still be required, but at significantly greater intervals than with conventional pond pump filter units. This maintenance may even be able to be omitted altogether, as long as the pressure built up by the pond pump is apparently sufficient. In many installations, one can readily see that the installation is functioning properly. For instance, in the case of a rotating ball fountain, it will be apparent that the ball is still rotating; in the case of a fountain that shoots a spray of water up into the air, the spray will apparently have the desired volume or reach the desired height. Or, when the pond pump pumps water into a filter tank, it will be apparent that the volume of water flowing into the tank is sufficiently large.

The filter unit according to the invention reduces and may even completely prevent contaminants from accumulating on the outside of the filter element. This also means that the filter unit may be smaller than those used in conventional pond pumps. Filter elements in conventional pond pumps are typically oversized for the specified flow, because they are dimensioned sufficiently large to allow a sufficient volume of water to be pumped through the system, even when some amount of material has accumulated on the surface of the filter element. The self-cleaning effect of the filter unit according to the invention means that a comparatively small filter element may be used, i.e., a smaller filter basket may be used to form a correspondingly smaller filter chamber. This is an advantage, because these smaller structural dimensions allow the pump-and-filter assembly according to the invention to be installed in small spaces, for example, in the base area of columns or similarly constructed water fountains.

The turbulence-producing device according to the invention, i.e., the swirler, has a rotary drive, so that it rotates in a manner that creates turbulence in the water and has physical features that enhance turbulence. For example, the swirler may include a one or more vanes or fingers or wire brackets, etc., or combinations of such elements.

The rotary drive for the swirler may be constructed in various ways, and it is advantageous if the construction allows the swirler to be retrofitted onto conventional pond pumps. One embodiment of the rotary drive that requires relatively little engineering effort has a filter shaft that is connected to the drive shaft of the pump motor and that extends into the filter chamber. The filter shaft may be directly connected to the drive shaft, such that it rotates at the same number of revolutions of drive shaft, or may be mounted on a longer shaft that has a section that is constructed like the conventional motor drive shaft and an adjoining section that forms the filter shaft and extends into the filter chamber. If it is desirable that the filter shaft rotate at a rotational speed different from that of the drive shaft, then a gear mechanism may be inserted between the filter shaft and the drive shaft.

The swirler may be attached to the filter shaft in a simple manner by providing a tube on the swirler so that it can simply be pushed or snapped onto the filter shaft. The swirler may be mounted on the filter shaft so as to be freely rotatable or be fixedly mounted to fasteners, such as adhesive means, pins, screws, or the like, which are then rotatably connected to the filter shaft.

There are various ways to assemble the filter unit onto the pump unit. For example, the filter unit may be fixedly mounted on the pump unit, for example, on the pump housing, so that it is not rotatable or otherwise movable. In this case, the swirler is provided as a separate element that creates the desired turbulence on the outside of the filter element, to prevent particles or debris from settling on the surface of the filter element.

Alternatively, the filter element may be movably mounted so that it serves as the swirler. There are various ways to have the filter element rotate. In one embodiment, the filter unit has a filter shaft and a filter element and the filter element is connected directly to the filter shaft in such a way that the filter element rotates at the same speed together with the filter shaft, regardless of what is used to drive the filter shaft. In another embodiment, the filter element may be assembled to be free-running, either relative to the filter shaft, or together with a freely rotatably mounted, non-driven filter shaft, so that the filter element rotates at a lower speed than, for example, the rotation of the drive motor or a pump element. For example, only the force of the flowing water may be used to achieve rotation of the filter element to rotate, or non-contact drive forces, such as magnetic drive forces, may be used.

A separate swirler may also be provided, even if the filter element is movable, i.e., even if the filter element also serves as a swirler. For example, the filter element forms the outer boundary of the filter chamber and rotates and an additional inner swirler is assembled inside the filter chamber. These two different swirlers may produce very different flow effects and it may also be desirable to have the two swirlers operate at different speeds. For example, the outer swirler, i.e., the filter element, may be set to rotate at a lower speed than the inner swirler, as a way to avoid such turbulence in the water that would impair pump output because of insufficient water being pumped through the unit. One way to do this is to provide a mechanical drive for the inner swirler and allow the filter element to rotate freely due only to the water flow, or to drive the filter element with a non-contact means, such as by a magnetic "entrainment effect" exerted by the inner swirler or the filter shaft. In this case, the filter element rotates at a lower rotational speed due to the water resistance.

The filter element and any elements that are possibly attached to the outside of the filter element are not constructed with sharp edges and, thus, do not pose any risk of injury, even if they rotate. If the filter element is not mechanically driven, and, particularly, if not even a magnetic drive is provided, but rather, the filter element runs completely freely, neither the movable inner swirler that is protected inside the filter chamber nor the filter element, nor any elements that are possibly provided on the outside of the filter element and that rotate with the filter element, present a risk of injury, so that even a toddler can stop a rotating filter component of the pump-and-filter assembly according to the invention without injury.

When two swirlers are used, it may be desirable to drive both swirlers in a defined way, in order to ensure specified properties of the pump-and-filter assembly. The following is an example of a way to achieve different speeds: the inner swirler is driven in rotation together with the filter shaft and rotates at the same speed as that of the pump drive motor. This is the case, for example, when the filter shaft is constructed as a particularly long shaft of the drive motor, or when the filter shaft is connected as a separate component to the drive motor shaft and in this way lengthens this shaft. The filter element may be driven at a lower speed than the speed of pump drive motor by providing a reduction gear between the drive motor shaft or the filter shaft on the one side and the filter element on the other side. Advantageously, this reduction gear may be assembled close to that end of the filter chamber that lies opposite the pump chamber in the pump unit, so that the water intake into the pump chamber is not affected by the gear. The reduction gear may be arranged inside the filter chamber or outside it.

Various constructions of the filter element are possible. Examples of suitable filter materials include: an open-celled plastic or ceramic foam material, a two-dimensional textile element that is a fleece, a woven fabric, a knitted fabric, or the like. Or the filter element may be metallic, for example, constructed from a mesh material, an expanded metal, or a perforated plate or sieve. In particular, when the turbulence is not caused by a rotational movement of the filter element itself, but, for example, is generated exclusively inside the filter chamber, the filter element is preferably made as thin as possible, to ensure that turbulence effect that is generated inside the filter chamber also propagates to the outside surface of the filter element. First practical experiments have shown excellent results with filter elements that are constructed from mesh, expanded metal or perforated plate materials.

The turbulence in the water on the unfiltered side of the filter element allows the filter unit to be operated trouble-free, maintenance-free, and, particularly, blockage-free, over a long period of time. A scraper may also be provided that scrapes against the unfiltered side of the filter element, as an additional protection against blockages, clogging, or for particularly difficult operating conditions. The scraper has a scraper edge, which is also referred to as a scraper blade, which lies up against the filter element, preferably tangentially and oriented opposite the direction of rotation of the filter element. In contrast to a radial alignment of the scraper, for example, this alignment of the blade pushes material that is sticking to the filter element up onto the scraper as the filter element rotates toward the scraper blade. This effectively scrapes material off of the filter element and also prevents material from accumulating on the scraper blade.

A first end of the filter shaft may be mounted in the area of the pump housing, for example, in the area of the motor housing or the pump chamber, and the second end remain free. Advantageously, however, the second end of the filter shaft is also supported by some bearing means, at a distance from the pump chamber, for example, in a bearing plate at the end of the filter chamber that is remote from the pump chamber. For this purpose, a bearing-plate frame may be connected to the pump housing and extend forward parallel to the filter chamber and support the bearing plate at the upstream end of the filter chamber. A bearing is provided in the end plate to receive and support the second end of the shaft and, in this way, the shaft is securely held in proper alignment.

The bearing-plate frame may be constructed as a connecting web that extends from one end from the pump housing and supports the end plate at the other end. The bearing-plate frame may also be constructed as a plurality of connecting webs or metallic rods that are distributed around the circumference of the filter chamber, for example, to form an open cage. However, the frame by be constructed as a single web, as long as the web has the mechanical stability to maintain a constant support of the bearing plate at the desired position, to reliably maintain the operative position of the filter shaft.

The bearing-plate frame may be constructed as a shell or hood that partially surrounds the filter chamber, and which is preferably provided at the bottom of the filter chamber. This is particularly advantageous when the pond pump is placed on the muddy bottom of a pond, because this construction, possibly in cooperation with the bearing plate, provides a protective shell that prevents the ingress of mud into the filter chamber. Regardless whether the bearing-plate frame is constructed of one or several webs or rods, such a protective shell or hood may be provided as a separate component that is optionally assembled, depending on the particular operating conditions for the pond pump.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
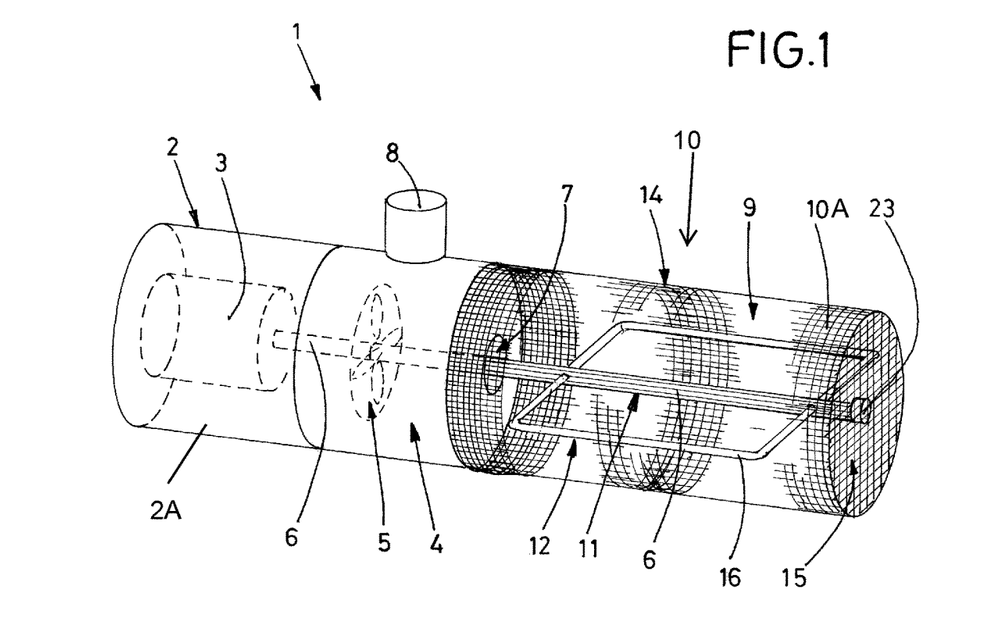
FIG. 1 is a perspective view of a first embodiment of a pond pump, showing a first embodiment of a swirler mounted inside the filter chamber.

FIG. 1 illustrates an embodiment of a pump and filter assembly 1 that is submersible in a pond, pool, fountain, or other type of water feature. Water flows through the assembly 1, so reference is made is in the discussion below to an upstream end where water flows in and a downstream end where the water flows. The pump-and-filter assembly 1 according to the invention comprises a pump unit 2 and a filter unit 10 that is attached to the pump unit 2 upstream of the pump unit.

The pump unit 2 includes a pump drive motor 3 enclosed in a motor housing 2A and a pump element 5 enclosed in a pump chamber 4. A pump drive shaft 6 extends from the pump motor 4 to the pump element 5 and causes the element 5 to rotate at the same speed as the pump motor 3. An intake port 7 is provided at the front and a discharge port 8 provided on the top of the pump chamber 4. The rotation of the pump element 5 generates a flow of water 7 so that unfiltered ambient water is drawn by the action of the pump element 5 through the filter unit 10 and then through the intake port into the pump chamber 4 and out the discharge port 8. In the embodiment shown, the intake port 7, the pump element 5, the drive shaft 6, and the drive motor 3 are in axial alignment. A hose or a pipe may be connected to the discharge port 8, so that the pump and filter unit 1 may be used not only to filter water, but also to transport filtered water to a remote location, for example, the pump and filter unit 1 may be placed in a pond on a relatively lower plane and transport water to a separate filter tank that is possibly placed on a higher plane.

The pump drive shaft 6 is shown in FIG. 1 as a single piece shaft, but it is understood that the drive shaft 6 may also be constructed with several axially successively arranged sections, and that a gear assembly may be inserted between the drive motor 3 and the pump element 5.

The filter unit 10 is attached to the pump unit 2 upstream of the intake port 7 and includes a filter element 10A that forms a wall that surrounds at least partially a filter chamber 9, i.e., is the boundary between the raw, unfiltered side that is outside of the filter element 10A and clean or filtered side inside the filter chamber 9. The filter element 10A may be made of any suitable material, such as a wire mesh, a perforated plate, an open-cell foam material, or the like.

In the embodiment shown, the pump drive shaft 6 extends through the pump element 5 and through the filter chamber 4. The section of the shaft that extends through the filter chamber 4 is referred to hereinafter as a filter shaft 11. Alternatively, the filter shaft 11 may be a separate shaft, which either connects directly to the pump element 5 and is rotated by it, or connects directly to the pump drive shaft 6 and is rotated by it. The use of a separate shaft makes it possible to retrofit the filter unit 10 to an existing pond pump.

The filter shaft 11 carries a turbulence-producing device, referred to herein as a swirler 12. Various constructions of the swirler 12 are suitable, as long as they create the desired turbulence. A first embodiment of the swirler 12 is show in FIG. 1. This swirler is made from two wire brackets 16 that are connected to the filter shaft 11 to form an open rectangular frame. The brackets 16 rotate together with the filter shaft 11, thereby creating the desired turbulence. The turbulence propagates out through the filter element 10A, so that not only is the water inside the filter chamber turbulent, but also the water being drawn onto the outside of the filter element 10A. This turbulence prevents unwanted material from being deposited on the outside of the filter element 10A.

If the filter shaft 11 is an extension of the drive shaft 6, then the shaft 11 rotates at the same rotational speed as that of the drive motor 3. As mentioned above, it is possible to provide the filter shaft 11 as a separate shaft that is connected to the pump element 5. Furthermore, if a gear is provided between the drive motor 3 and the pump element 5, then the filter shaft 11 rotates with a different speed relative to the speed of the drive motor, depending on the gear ratio. A person of skill in the art will be familiar with other suitable ways of driving the filter shaft 11. It is possible, for example, to use a separate drive—for example, an electric motor—to drive the filter shaft 11. In this case, the filter shaft 11 does not have to be mechanically connected to the drive motor 3 or to a component that is driven by the motor 3.

The filter chamber 9 shown in FIG. 1 is a cylindrical space bounded by the filter element 10A that forms a circumferential wall 14 and by an end wall 4A of the pump chamber 4 at the downstream end of the chamber 9, where the intake port 7 is located, and by a filter end wall 15 at the upstream end, which, in this embodiment, is constructed as a water-permeable wall. A bearing 23 for the filter shaft 11 is provided in this filter end wall 15. The bearing 23 may be, for example, a ring made of plastic or metal, through which the filter shaft 11 extends. Notwithstanding the illustrated embodiment, the second end wall 15 of the filter chamber 9 may also be constructed as a solid plate.

Rather than being supported by the circumferential wall 14, the end wall 15 may be held in place by one or more retainers that are spaced a distance from the pump chamber 4. In this case, the filter element 10A may be particularly simple construction, namely, not hood-shaped or shell-shaped, but as a cylindrical pipe section, whereby the one or more mentioned retainers as well as the use of a solid plate as the end wall 15 provide a very stable support of the filter shaft 11.

As mentioned above, a gear may be inserted between the drive motor 3 and the pump element 5. In this case, it is particularly advantageous, if the gear is not provided in the motor housing 2A, but in the filter chamber 9, some distance upstream of the intake port 7. One advantage here is that the dimensions of the motor housing 2 and the pump chamber 4 do not have to be changed to accommodate the gearing; also, the forward placement of the gear means does not impede the flow path of the water as it flows from the intake port 7 through the chamber 4 to the discharge port 8. A further advantage is that this arrangement makes it possible to retrofit existing commercial pond pumps simply by mounting the filter unit 2 along with its filter chamber 9, any other fittings, and the mentioned gear onto the existing pond pump 2, so as to achieve a pump-and-filter unit 1 according to the invention.

Figure 2:
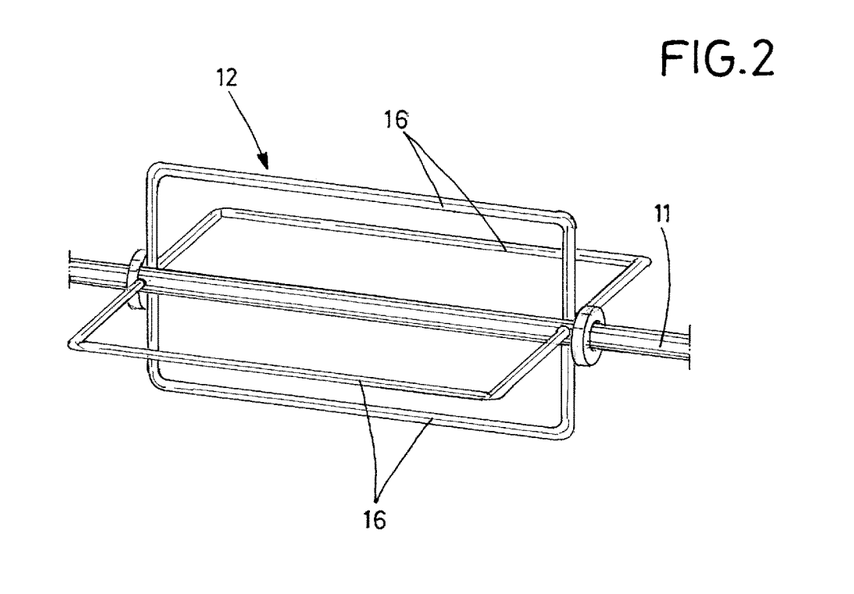
FIG. 2 is a perspective view of a second embodiment of the swirler.

FIGS. 2-9 illustrate additional suitable embodiments of the swirler 12. FIG. 2 illustrates a second embodiment of a swirler 12, which, in contrast to the embodiment shown in FIG. 1, has four brackets 16 that are attached at ninety-degree intervals around the filter shaft 11 or form pair-wise two rectangular frames that are attached to the shaft 11 so that the frames are cross-wise to each other.

Figure 3:
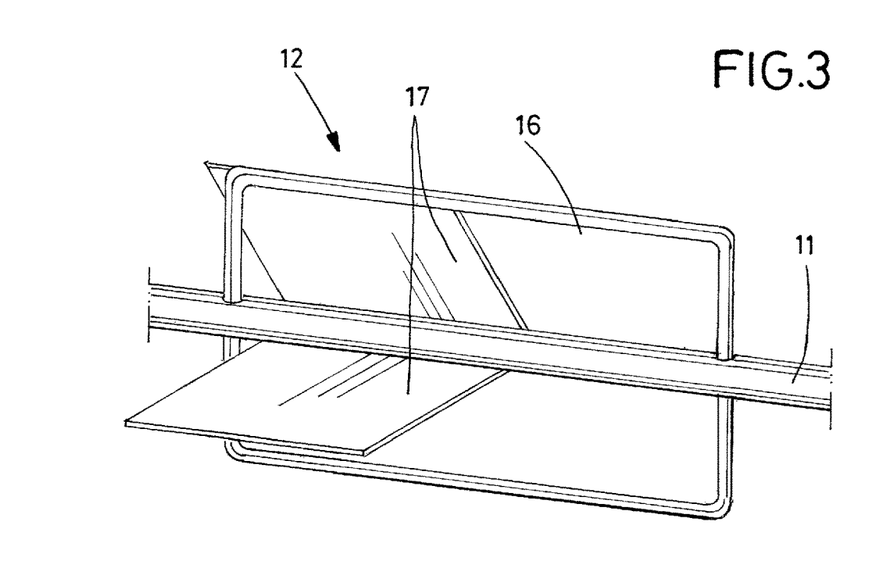
FIG. 3 is a perspective view of a third embodiment of the swirler.

FIG. 3 illustrates a third further embodiment of the swirler 12, which is similar to the embodiment shown in FIG. 1, but also includes solid, i.e., perforation-free, vanes 17.

Figure 4:
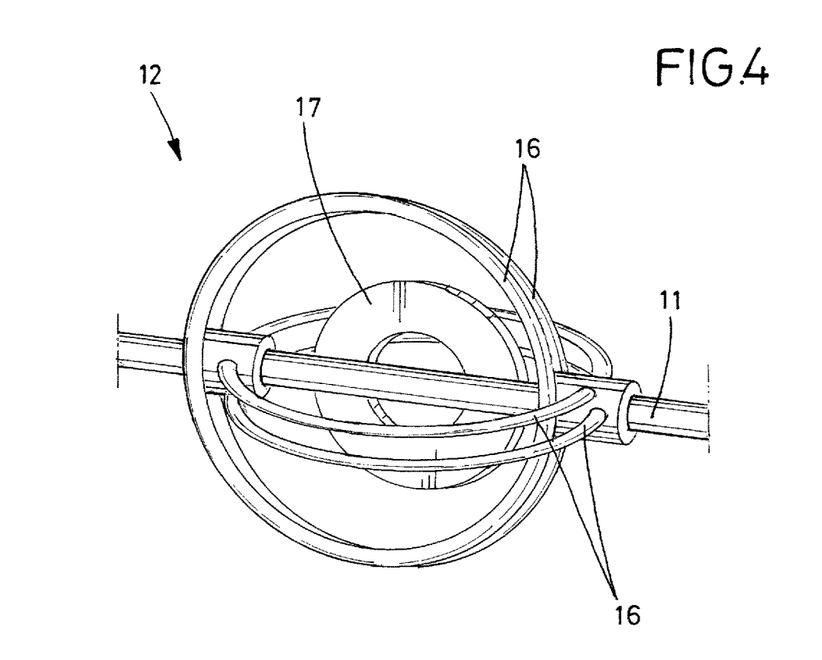
FIG. 4 is a perspective view of a fourth embodiment of the swirler.

FIG. 4 illustrates a swirler 12, which is less elongated than the embodiments of FIGS. 1 to 3. This swirler 12 has four horizontal, semicircular brackets 16 and two circular, stationary brackets 16 that form a total of two intersecting circular rings within which a likewise circular vane 17 is arranged. The vane 17 has a central opening and may be provided as an inexpensive commercial washer or diameter washer. The vane 17 may also be provided as a perforated vane, whereby a perforated plate is used as the vane.

Figure 5:
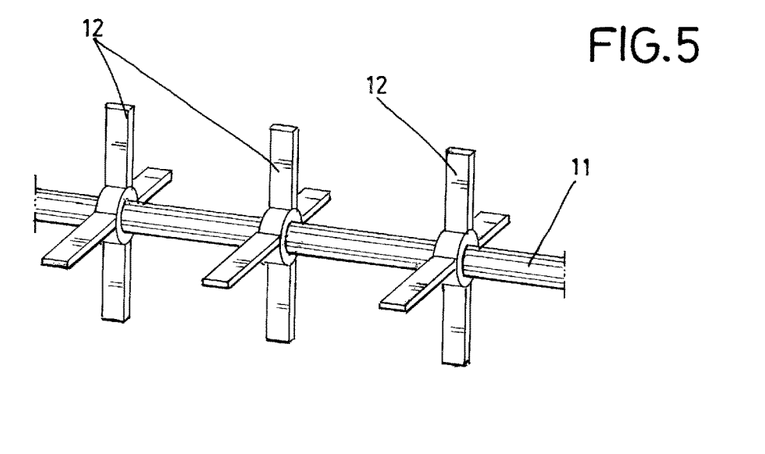
FIG. 5 is a perspective view of a fifth embodiment of the swirler.

FIG. 5 shows a plurality of swirlers 12, which are constructed as crosses made of plastic and arranged at an axial distance from each other on the filter shaft 11, each swirler 12 extending only over a short axial length of the filter shaft 11. A single one of these short swirlers may also be used. Although not shown in the figure, it is understood that spacers may be used to space two or more swirlers 12 apart. For example, a sleeve made of metal or plastic that is simply pushed onto the filter shaft 11 may be used as the spacer.

Figure 7:
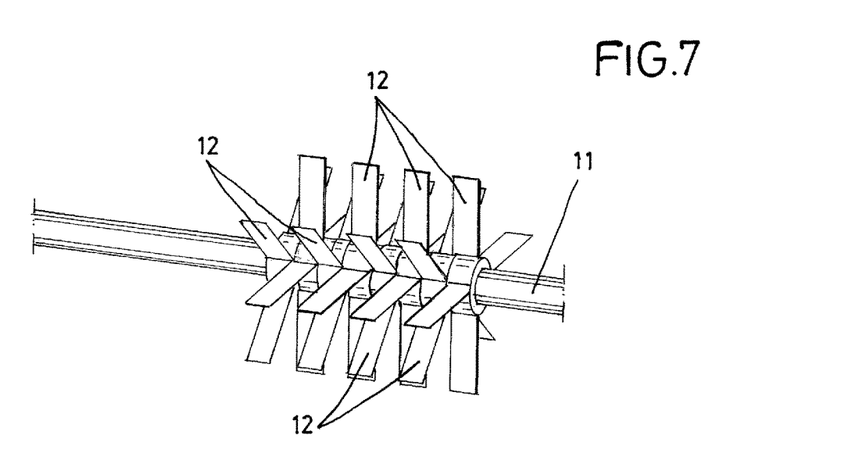
FIG. 7 is a perspective view of a seventh embodiment of the swirler.

Depending on the construction of the filter unit 10, several of these short swirlers 12 may be arranged axially one behind the other on the filter shaft 11, as shown in FIG. 5, in order to ensure a sufficient turbulence of the water along the entire filter element 10A, or be assembled tightly adjacent to each other, as shown in FIG. 7, where the swirlers 12 are arranged without any axial spacing, directly abutting each other and circumferentially offset in each case to an adjacent swirler 12.

Figure 6:
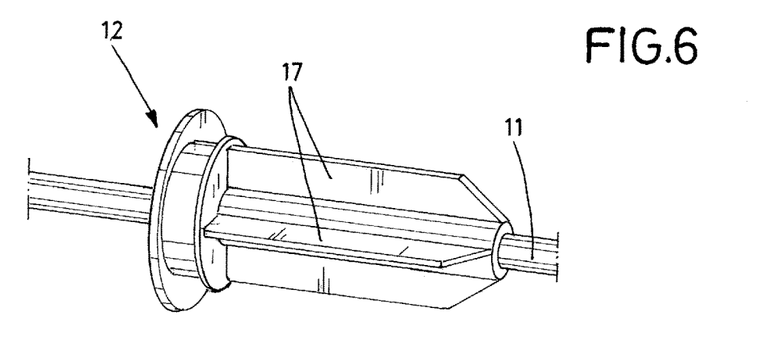
FIG. 6 is a perspective view of a sixth embodiment of the swirler.

FIG. 6 illustrates a swirler 12 that is constructed as an elongated plastic molded component having four vanes 17 that extend over a relatively longer axial portion of the filter shaft 11. The length of this single long swirler 12 ensures that turbulence is created that acts on the entire filter element 10A, for example, the filter basket shown in FIG. 1.

Figure 8:
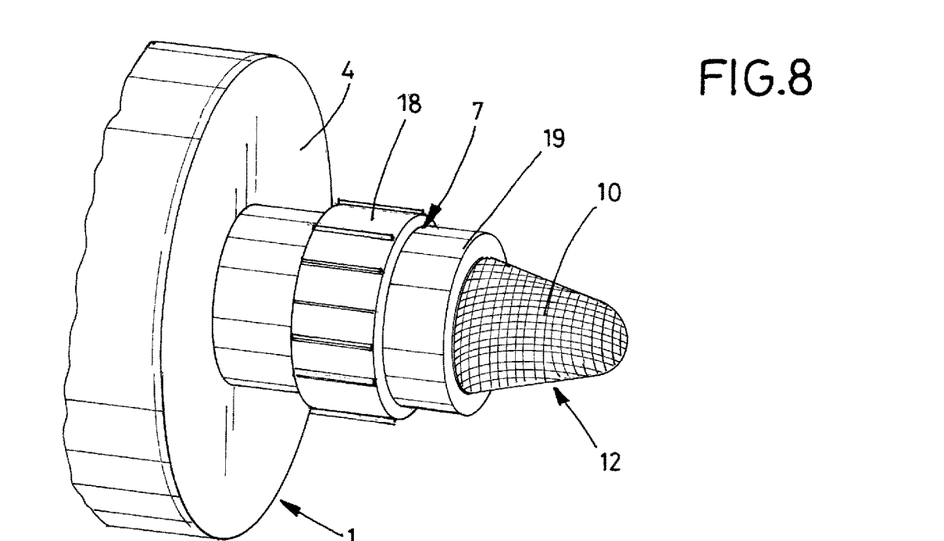
FIG. 8 is a perspective view of eighth embodiment of the swirler, in which the filter element serves as the swirler.

Instead of a swirler 12 that is a provided as an additional element, along with a filter shaft 11, to an otherwise conventional pond pump 2, the filter element 10A itself may be set in motion, so that in this case, the filter element 10A itself forms the swirler 12. FIG. 8 illustrates an embodiment of the pump-and-filter unit 1 according to the invention, in which a pipe socket 18 extends from the end wall of the pump chamber 4 and forms the intake port 7. The filter element 10A, in this embodiment a filter basket, is attached to a retainer sleeve 19 that is held in place by the pipe socket 18, such that the filter element 10A and retainer rotate together with the rotation of the filter shaft 11. The retainer sleeve 19 has a disc that is stationary and oriented transverse to the filter shaft 11. The stationary disc is provided with openings, so that the water flows in the axial direction parallel to the filter shaft 11 into the intake port 7. Alternatively to the mentioned disc, spokes may be provided which connect the retainer 19 directly with the filter shaft 11, thereby creating the largest possible flow-through openings within the retainer 19.

As an alternative to actively driving the filter element 10A by means of the filter shaft 11 as shown in the illustrated embodiment, the filter element 10A may be mounted on external housing components or on the filter shaft 11, so as to be freely rotatable, i.e., also rotatable independently of the filter shaft. This free rotational mobility of the filter element 10A means that the filter element may be set in rotation by the force exerted by the water flowing into the pump-and-filter unit 1.

Aside from the illustrated embodiments, if the filter element 10A itself serves as swirler 12 and rotates at a slower rate than the drive shaft 2 or the filter shaft 11, for example, because a reduction gear is inserted into the drive train or the filter element is mounted in a driveless manner to be freely rotatable, then the filter element 10A may be connected to flow surfaces that are mounted to rotate together with the filter element 10A. These flow surfaces improve the turbulence effect and also, when the filter element 10A is mounted to be freely rotatable similar to turbine vanes, they also act as drive elements for the filter element 10A, because the forces exerted on them by the water flow causes them to rotate together with the filter element 10A. For example, such flow surfaces may be arranged on the filter element 10A or on a component connected to the filter element 10A, similar to the retainer 19.

A magnet mounted on the filter shaft 11 may be used as a contactless drive for the filter element 10A. This requires, of course, that the filter element 10A be made of a ferromagnetic material or be equipped with magnets that cooperate with the magnet on the filter shaft 11. Also, a swirler 12 may be provided on the filter shaft 11 inside the filter element 10A. This is advantageous, because the turbulent water caused by this swirler 12 also develops a drive action for the freely rotatably mounted filter element 10A.

Different swirlers 12 may be combined with each other, as was already made clear with the combination of a rotatable filter element 10A, which is itself a swirler 12, and an additional swirler 12 within the filter element 10A. It is understood that variations from the swirlers 12 shown in FIGS. 1 to 7 may also be used, for example, a combination of a long swirler 12 and a short swirler 12 arranged on the same filter shaft 11.

Figure 9:
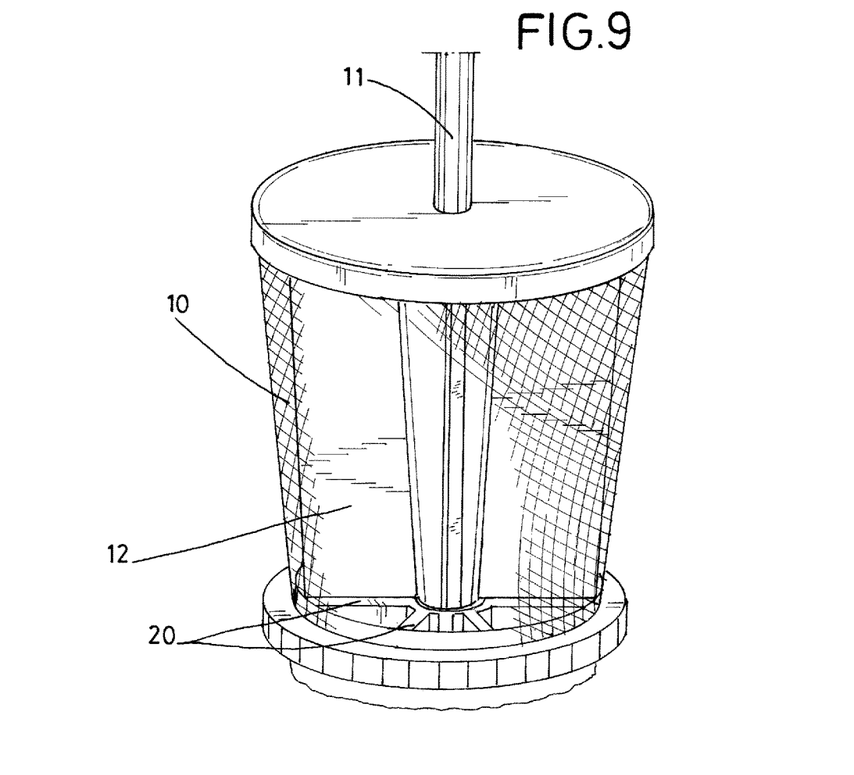
FIG. 9 is a perspective view of an ninth embodiment of the swirler, in which the filter element is a filter basket that acts as a swirler, and in which an inner swirler is assembled inside the filter chamber.

FIG. 9 illustrates an embodiment of the filter unit 10 that includes a combination of two different swirlers 12. The filter element 10A constructed as a filter basket that is connected to the filter shaft 11 via a star-shaped carrier 20A having a plurality of radial spokes 20. This filter basket 10A is set in rotation by the filter shaft 11, thereby serving as a first swirler 12. In addition, a second, long swirler 12 is assembled on the filter shaft 11 inside the filter basket 10A.

In the illustrated embodiments, the filter shaft 11 serves to drive a swirler 12 to generate turbulence in the water in the immediate vicinity of the filter element 10A. It is not necessary, however, to use a rotating shaft to generate the turbulence. A person of skill may use commonly known and therefore not specifically defined other possibilities to generate motion in the water near the filter element and thus to achieve the desired turbulence in the immediate vicinity of the filter element 10A, or to set the filter element 10A itself in motion to serve as the swirler 12.

The illustrated embodiments represent a particularly simple way structurally to improve upon the conventional pond pump to achieve the pump-and-filter assembly 1 according to the invention. It is possible to provide the pump-and-filter assembly 1 by implementing relatively minor changes in the production of the unit at the factory. It is also possible to retrofit an existing pond pump that has a filter unit with comparatively little effort, for example, by replacing the housing of the existing filter chamber with a housing that is equipped with a swirler 12 and a filter shaft 11. In this case, the filter shaft 11 is constructed to be connectible to the existing filter unit in a way that transmits the rotational motion of the pump element 5 to the filter shaft 11, for example, to a claw clutch.

Figure 10:
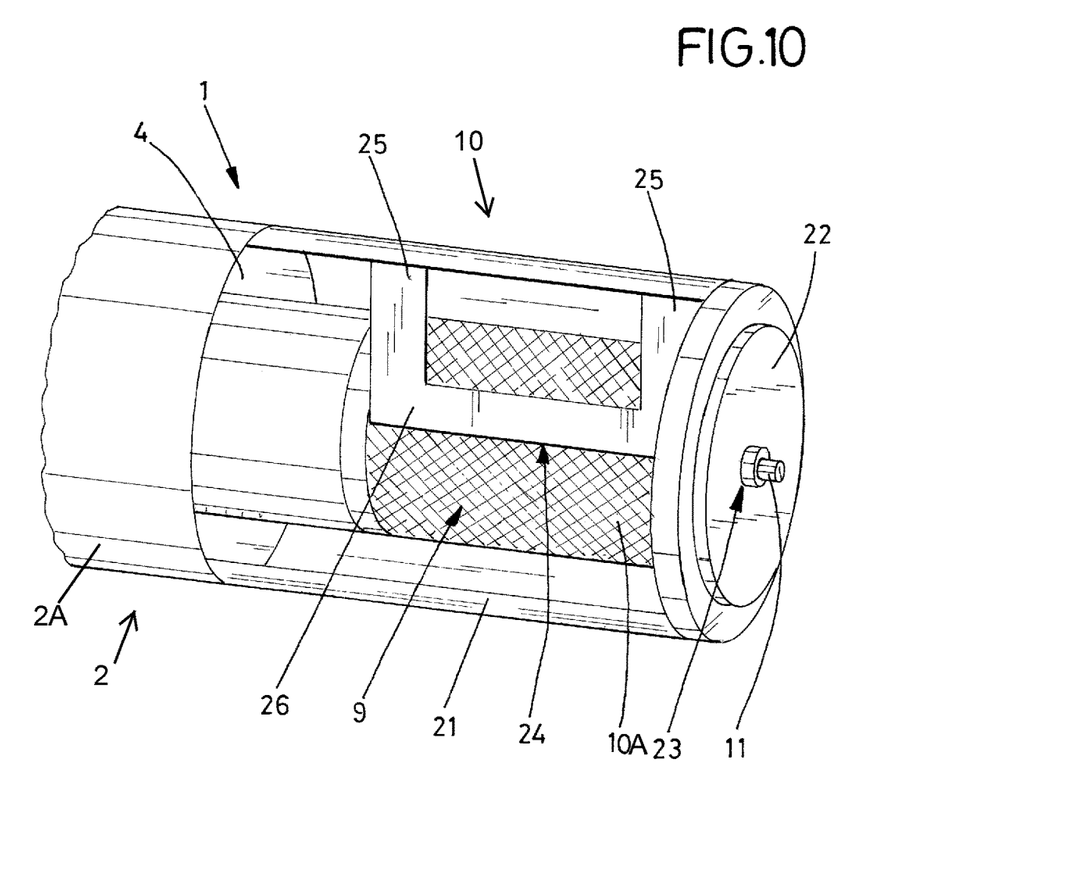
FIG. 10 is a perspective view a second embodiment of the pond pump, illustrating a scraper that scrapes material from the outside surface of the filter element.

FIG. 10 illustrates an embodiment of a pump-and-filter assembly 1 that includes a scraper 24 to scraping debris from the outside surface of the filter element 10A. A bearing plate frame 21 is affixed to a section of the housing on the pump chamber 4 and extends forward along the filter unit 10. A bearing plate 22 is assembled on an outer end of the frame 21. The bearing plate 22 supports a bearing 23 in which the filter shaft 11 is mounted, so that the shaft is stably supported at at least two spaced apart locations, one location being on the motor housing 2 and/or the pump chamber 4 and the other location being on the bearing plate 22.

The bearing plate frame 21 is constructed in this embodiment as a web or a shell that extends along the bottom of the filter unit 10, but it is understood, that this frame made of connecting webs 21 may extend along another circumferential section of the filter chamber 9. Also, the bearing plate frame 21 may be constructed from a plurality of rods that are distributed around the circumference of the filter chamber 9 and extend from the pump chamber 4 beyond the upstream end of the filter chamber 9, to form a cage-like frame that holds the bearing plate 22 in a defined position.

The bearing plate frame 21 shown in FIG. 10 is constructed as a half-shell that surrounds approximately the lower half of the filter element 10A, whereby this half-shell is spaced some distance away from the filter chamber 9, so that water is still able to flow freely into the filter chamber 9 through the filter element 10A in the area between the frame 21 and the filter element 10A. This construction of the frame 21 is particularly advantageous, when the pump-and-filter unit 1 is placed on a muddy pond bottom. In this situation, the frame 21 serves as a protective shell, due to its design as a half shell, and frame 21 and bearing plate 22 together prevent the ingress of mud particles into the filter chamber 9.

In the embodiment of FIG. 10, it is intended that the filter element 10A and a swirler 12 inside the filter chamber 9 both rotate to create the desired turbulence. The filter element 10A is driven at a lower speed than the inner swirler 12, in order to avoid that the motion of the filter element 10A generates a flow that impedes the ingress of water into the filter chamber 9 and reduces the output of the pond pump 2 to an undesirable degree. The inner swirler 12 may, for example, be constructed the same as the swirler 12 shown in FIG. 1 and be fixedly mounted on the filter shaft 11, so that this inner swirler 12 rotates at the speed of the filter shaft 11, for example, at the engine speed of the drive motor 3. A reduction gear is arranged close to the bearing 23. This reduction gear may be mounted on the bearing plate 22, i.e., outside of the filter chamber 9, or inside the filter chamber 9. The input side of the reduction gear is driven by the filter shaft 11, for example, at the engine speed of the drive motor 3, and the output side drives the filter element 10A, which serves as the outer swirler 12, for example, by means of gear teeth provided on the filter element 10A. If the filter chamber 9 of the embodiment of FIG. 10 has its own end wall 15 near the bearing plate 22, gear teeth may be provided on this end wall 15, thereby making it possible to drive the filter element 10A. The bearing plate 22, however, may also form the end wall 15 of the filter chamber 9. In this case, the filter element 10A may be configured simply as a pipe section.

The scraper 24 shown in FIG. 10 has two retaining arms 25 and a scraper blade 26. These components of the scraper 24 may be configured together as an approximately U-shaped part stamped from sheet metal. The two retaining arms 25 are attached to the bearing plate frame 21. The scraper 24 is arranged such that the direction of rotation of the filter element 10A transports material that has built up on the outside of the filter element 10A onto the scraper blade 26 and toward the free edge of the scraper blade 26 on the opposite side of the holding arms 25.

In this embodiment, the support arms 25 have U-shaped end pieces so that the scraper 24 is fastened to the frame 21 simply by snapping the support arms 25 onto the edge of the frame 21. Thus, it is a simple matter to retrofit the scraper 24 onto the pump-and-filter assembly 1, without using tools or having to remove the unit from the pond. Under most common operating conditions, however, the pump-and-filter assembly 1 may be operated without a scraper 24 for a long period, trouble-free and without clogging.

Alternatively, the scraper 24 may be attached to the frame 21 with screws or similar fastener elements. This ensures that the scraper blade 26 reliably maintains a certain desired position. Oblong holes may be provided on the frame 21 for receiving screws on the scraper 24. This enables an adjustment in the orientation of the scraper blade 26 relative to the surface of the filter element 10A, and also of the pressure with which the scraper blade 26 presses against the filter element.

In the embodiment of FIG. 1, the filter shaft 11 is supported at the upstream end of the filter chamber 9 on the end wall 15 by means of the bearing 23, when the filter element 10A including the end wall 15 is fixedly assembled. If, however, the entire filter element 10A including the end wall 15 is rotatably mounted to form a swirler 12 itself, then one end of the filter shaft 11 may be mounted in the area of the motor housing 2 and the pump chamber 4, and the other end may be a free end that extends away from the pump chamber 4. But, if the bearing 23 is affixed to the housing of the pond pump 2, for example, by means of one or more webs in a frame 22 and possibly also a bearing plate 23 as shown in the embodiment of FIG. 10, then the filter shaft 11 may be supported at some distance from the pump housing, even with a rotatable filter element 10A.

The various embodiments of the swirlers 12, including a movable filter element 10A, make it clear that a multiplicity of different geometries and arrangements may be used to achieve the desired turbulence in the water on the outside of the filter element 10A. Different swirlers 12 may be advantageous for different constructions of the pond pumps 1. For example, despite the same geometry, two different pump-and-filter assemblies 1 may be created if their pump elements 5 run at two different rotational speeds. For the resulting different pump intake flows, it is possible that different swirlers 12 may be optimally suitable. In any case, the swirlers 12 may advantageously be configured and arranged such, that the filter element 10A is reliably kept free of deposits, without negatively influencing the pump intake flow, so that the pump-and-filter assembly 1 ensures sufficient pump output and extended periods of operation without clogging of the filter element 10A.

It is understood that the embodiments described herein are merely illustrative of the present invention. Variations in the construction of the pump-and-filter assembly may be contemplated by one skilled in the art without limiting the intended scope of the invention herein disclosed and as defined by the following claims.

What is claimed is:

1. A pump-and-filter assembly for submersible use in water, the pump-and-filter assembly comprising:
   a pump unit that includes a pump motor, a drive shaft, and a pump element that causes the water flow to be drawn into the pump chamber through an intake port and discharged through a discharge port; and
   a filter unit that includes a filter element that at least partially surrounds a filter chamber, the filter element being an outer turbulence-producing device that is rotationally driven and that creates turbulence in the water flow on the outside surface of the filter element;
   an inner turbulence-producing device that is movably mounted within the filter chamber;
   a filter shaft that is connected to the drive shaft and extends through the filter chamber, the filter shaft being rotationally driven about a longitudinal axis;
   wherein the filter unit is provided upstream of the pump unit;
   wherein the filter element is supported so as to be freely rotatable independent of the filter shaft;
   wherein the inner turbulence-producing device causes a rotational water flow that drives the filter element; and
   wherein the turbulence in the water flow works against material being deposited on the outside surface of the filter element.

2. The pump-and-filter assembly of claim 1,
   wherein a magnetic element is provided on the filter shaft; and
   wherein the filter element is constructed to magnetically cooperate with the magnetic element, such that the filter element is rotationally driven by means of magnetic force from the rotating magnetic element.

3. The pump-and-filter assembly of claim 1, wherein the filter element is set in rotation by the water flowing drawn in by the pump unit.

4. The pump-and-filter assembly of claim 2, wherein the outer turbulence-producing device is mounted on the filter shaft.

5. The pump-and-filter assembly of claim 1, wherein the filter shaft is rotationally driven about the longitudinal axis and wherein the outer turbulence-producing device is connected with the filter shaft, so as to rotate together with the filter shaft.

6. The pump-and-filter assembly of claim 5, wherein the pump element is rotatable and wherein the filter shaft is connected to the pump element and driven by the pump element.

7. The pump-and-filter assembly of claim 5, wherein the filter shaft is constructed as an extension of the drive shaft and rotates together with the drive shaft.

8. The pump-and-filter assembly of claim 5, the filter unit further including a filter drive motor and wherein the filter drive motor rotationally drives the filter shaft.

9. The pump-and-filter assembly of claim 1, wherein the filter shaft has a first drive means and the outer turbulence-producing device has second drive means; and
   wherein a gear is inserted between the first and second drive means such that the outer turbulence-producing device rotates at a different speed than the rotational speed of the first drive means.

10. The pump-and-filter assembly of claim 9, wherein the inner turbulence-producing device is mounted inside the filter chamber, and wherein a gear is provided between the inner turbulence-producing device and the filter element, such that the filter element is driven at a lower speed than the speed of the inner turbulence-producing device.

11. The pump-and-filter assembly of claim 1, wherein the outer turbulence-producing device includes a turbulence-enhancing element from a group that includes a bracket that rotates around a free space, a solid vane, and a perforated vane.

12. The pump-and-filter assembly of claim 1, wherein the filter element is constructed as a filter basket.

13. The pump-and-filter assembly of claim 1, wherein the filter element is constructed as a pipe section.

14. The pump-and-filter assembly of claim 1 further comprising a scraper that is mounted to lie up against an outer surface of the filter element.

15. The pump-and-filter assembly of claim 4, the filter unit including a bearing-plate frame and wherein a downstream end of the bearing plate frame is connected to the housing of the pump unit and an upstream end of the bearing-plate frame extends beyond the filter chamber and supports a bearing plate that contains a bearing for receiving and supporting an upstream end of the filter shaft.

16. The pump-and-filter assembly of claim 1, the filter unit further including a protective shell and wherein the protective shell surrounds at least partially the filter chamber, the protective shell being spaced a distance from and beneath the filter chamber.

17. A filter unit for use with a pond pump, the filter unit comprising:
   a filter element that surrounds at least partially a filter chamber and a filter shaft that extends through the filter chamber and is rotatable about a longitudinal axis of the filter shaft;
   a turbulence-producing device that includes an inner turbulence-producing device and an outer turbulence-producing device; and
   a drive means for rotationally driving the turbulence-producing device;
   wherein the drive means causes the filter element to rotate, such that the filter element forms the outer turbulence-producing device; and
   wherein the inner turbulence-producing device is mounted inside the filter chamber;
   wherein water pumped by the pond pump is drawn through the filter element into the filter chamber;
   wherein the turbulence-producing device generates turbulence on an outer surface of the filter element, thereby preventing material in the water flowing through the filter element from being deposited on the outer surface of the filter element.

18. The filter unit of claim 17, wherein the drive means for driving the turbulence-producing device is a contactless magnet means; and
   wherein a magnetic element is provided on the filter shaft and the filter element is constructed to magnetically cooperate with the magnetic element to rotationally drive the filter element, such that the filter surface is rotationally driven by means of magnetic force from the rotating magnetic element.

* * * * *